United States Patent Office 3,280,222
Patented Oct. 18, 1966

3,280,222
AMINOPHENOXY AND NITROPHENOXY PHOSPHONITRILES
Ehrenfried H. Kober, Hamden, Henry F. Lederle, North Haven, and Gerhard F. Ottmann, Hamden, Conn., assignors to Olin Mathieson Chemical Corporation, a corporation of Virginia
No Drawing. Filed Nov. 15, 1965, Ser. No. 507,684
8 Claims. (Cl. 260—927)

This invention relates to novel cyclic polymeric phosphonitrile compounds and to a method for their preparation. More particularly, this invention relates to oxyalkylated cyclic polymeric aminophenoxy phosphonitriles prepared by reacting a cyclic polymeric aminophenoxy phosphonitrile with an alkylene oxide or a hydroxyalkylene oxide.

The novel cyclic polymeric oxyalkylated aminophenoxy phosphonitriles of this invention have the formula:

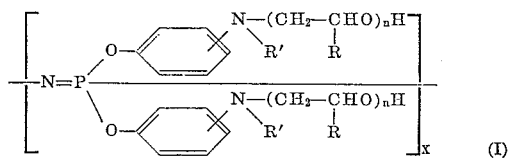
(I)

wherein $x$ is an integer of from 3 to 7, $n$ is an integer of from about 1 to about 20 inclusive, R is selected from the group consisting of hydrogen, alkyl of from 1 to 4 carbon atoms, and hydroxyalkyl of 1 to 4 carbon atoms, and R' is hydrogen or

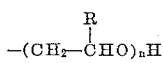

Generally, the oxyalkylation reaction is conducted by reacting a cyclic polymeric aminophenoxy phosphonitrile with an alkylene oxide or a hyroxyalkylene oxide at temperatures of from about 80 to about 200° C. and in the presence of an alkaline catalyst which can be, for example, potassium hydroxide, sodium hydroxide, alkali metal oxides, etc. From about 1 mole to about 40 moles or more of alkylene oxide or hydroxyalkylene oxide are reacted with each —NH$_2$ group of the cyclic polymeric aminophenoxy phosphonitrile starting material. Suitable alkylene oxides and hydroxyalkylene oxides include, for example, ethylene oxide, propylene oxide, butylene oxide and glycidol.

Cyclic polymeric aminophenoxy phosphonitriles (II) having the formula shown below:

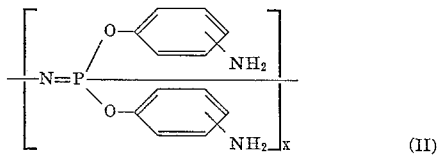
(II)

wherein $x$ is an integer of from 3 to 7 inclusive, can be conveniently prepared by the catalytic hydrogenation of the corresponding nitrophenoxy phosphonitriles. Although the catalytic hydrogenation of an aromatic nitro compound to the corresponding amine is well known in the art, it is surprising in the case of nitrophenoxy phosphonitriles, that the nitro group can be coverted to the amino group by hydrogenation without the PN— ring being attacked. Preparation of the cyclic polymeric aminophenoxy phosphonitriles from phosphonitrilic chloride and aminophenol cannot be accomplished due to the bifunctionality of aminophenol which gives rise to an undesired mixture of aminophenoxy and hydroxyanilino phosphonitriles and since, in addition, the amino group as well as the hydroxy group of aminophenol can react with chlorine atoms of more than one phosphonitrilic chloride molecule to give polymeric products containing more than one phosphonitrilic ring in the molecule. In contrast, the method described herein allows the preparation of polyfunctional aminophenoxy phosphonitriles of structure II in high yields.

The novel compounds of structure II, as previously mentioned, are obtained by catalytic hydrogenation of a cyclic polymeric nitrophenoxy-substituted phosphonitrile in a suitable solvent, such as an alcohol; dioxane or an amine, such as aniline, in the presence of a hydrogenation catalyst which can be, for example, Raney nickel, platinum or palladium, at a pressure of 250 to 2000 p.s.i., and at a reaction temperature of 50 to 150° C. The preferred pressure is from about 800 to 1200 p.s.i. while the preferred temperature is from about 70 to 100° C. Recovery of the reaction product is accomplished by conventional techniques. Thus, after separation of the catalyst, the solvent can be removed by distillation in vacuo, the residue washed with water or another suitable solvent and recrystallized or distilled for final purification.

The oxyalkylated compounds of this invention are valuable for the preparation of water-soluble, non-flammable hydraulic fluids and lubricants. Thus, the oxyethylation of trimeric bis(p-aminophenoxy)phosphonitrile yields a water-soluble fluid with high temperature and oxidative stability as well as good lubricity.

*Example I.—Trimeric bis(p-aminophenoxy) phosphonitrile*

Fifty grams of trimeric bis(p-nitrophenoxy)phosphonitrile was dissolved in 450 g. of aniline. This mixture was hydrogenated in a stainless steel autoclave at 80–90° C. in the presence of 10 g. of Raney nickel under about 1000 p.s.i. of hydrogen pressure until the hydrogen uptake stopped. The catalyst was filtered from the cooled product and the aniline solvent was stripped off in vacuo. The yield of crude product obtained was 96.4 percent. The product was powdered, dissolved in hot methanol and poured into water to remove nickel salts. The amine was again taken up in methanol and then poured into water, the procedure being repeated until the nickel salts had been completely removed. A final recrystallization from methanol gave the pure trimeric bis(p-aminophenoxy)phosphonitrile, M.P. 189–190° C., having the formula:

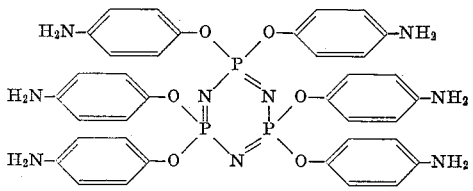

Analysis.—Calc'd for $C_{36}H_{36}O_6N_9P_3$: percent C, 55.17; percent H, 4.63; percent P, 11.80; percent N, 16.12. Found: percent C, 55.17; percent H, 4.91; percent P, 11.61; percent N, 1631, 1611.

*Example II.—Oxyethylated trimeric bis(p-aminophenoxy) phosphonitrile*

A 500 ml. multiple neck flask, fitted with a magnetic stirrer, thermometer, efficient condenser (on top of which a Dry Ice condenser was placed) and a jacketed dropping funnel, was charged with 13.1 g. (0.0167 mole) trimeric bis(p-aminophenoxy)phosphonitrile prepared in Example I, 50 g. of diethylene glycol dimethyl ether, and 0.5 g. of potassium hydroxide. A dry nitrogen atmosphere was maintained throughout the reaction and moisture was excluded by placing a drying tube on top of the Dry Ice condenser. Ice water was pumped through the condenser and through the jacketed dropping funnel.

Heating and stirring were started and when about 160° C. was reached, 66.0 g. (1.5 moles) of ethylene oxide was added slowly via the dropping funnel. After absorption was completed, the product was heated for another hour at 160° C. following which the solvent was stripped to about 225° C. bottoms temperature. An acid-type clay (Attaclay), 5 g., was then added and the mixture was stirred in vacuo (about 20 mm. Hg) at 180° C. bottoms temperature for 30 minutes. After filtration, the yield of oxyethylated product was 37.9 g.

Analysis of the oxyalkylated product indicated that 5.63 moles of ethylene oxide had reacted with each amino group of the initially charged trimeric bis(p-aminophenoxy)phosphonitrile.

The novel cyclic polymeric nitrophenoxy phosphonitriles of this invention include compounds of the formula:

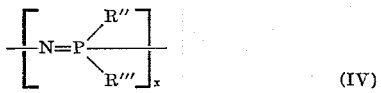
(IV)

wherein $x$ is an integer of from 3 to 7 inclusive and the R″ and R‴ substituents of each unit of the formula:

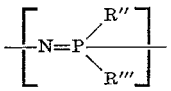

are independently selected from the group consisting of chlorine, bromine, fluorine and the nitrophenoxy group and with the proviso that at least one of the R″ and R‴ substituents is a nitrophenoxy group. Suitable nitrophenoxy phosphonitriles include 2,4,6-tris(p-nitrophenoxy)-2,4,6-trichlorophosphonitrile, 2,2,4,4-tetra(p-nitrophenoxy)-6,6-dichlorophosphonitrile, 2,2,4,4,6-pentakis(p-nitrophenoxy) - 6 - chlorophosphonitrile, and 2,2,4,4,6,-hexakis(p - nitrophenoxy)phosphonitrile, etc. and the similarly substituted tetrameric, pentameric, hexameric, and heptameric materials.

The completely substituted cyclic polymeric nitrophenoxy phosphonitriles, as previously mentioned, can be hydrogenated to yield the corresponding aminophenoxy phosphonitriles while the chlorine-substituted nitrophenoxy phosphonitriles can be reacted with phenol in the presence of sodium hydroxide, according to the method of Fitzsimmons and Shaw, J. Chem. Soc., 1964, p. 1735, to yield the corresponding nitrophenoxy phosphonitrile which, in turn, can be hydrogenated and the resulting aminophenoxy phenoxy phosphonitrile can be oxyalkylated with an alkylene oxide, such as ethylene oxide, etc., to give valuable compounds suitable for use in non-flammable hydraulic fluids and lubricants.

Cyclic polymeric nitrophenoxy-substituted phosphonitriles as described above can be prepared by adding a phosphonitrilic chloride to a well-agitated mixture of nitrophenol containing an alkali metal hydroxide, such as potassium or sodium hydroxide, and an aromatic hydrocarbon such as benzene, toluene or xylene, at a temperature between 50 and 200° C. but preferably at 80–100° C. The exothermic reaction which ensues will raise the temperature to the boiling point of the hydrocarbon-water azeotrope and thus facilitates the swift removal of water formed in the reaction. After all of the phosphonitrile compound has been added, refluxing is maintained until no more water is collected and is continued for a period of time which may total as much as 30 hours or more. Nitrophenoxy-substituted phosphonitriles also can be prepared by reacting a phosphonitrilic chloride with an alkali metal nitrophenoxide.

*Example III.—Trimeric bis(p-nitrophenoxy)phosphonitrile*

A 3 liter three neck flask equipped with stirrer, dropping funnel, azeotrope trap, and condenser was charged with p-nitrophenol (1.50 moles, 208.6 g.), potassium hydroxide (1.50 moles, 93.5 g.), and 1000 ml. of xylene. The mixture was heated to 80° C. Trimeric phosphonitrilic chloride (0.2 mole, 69.5 g.) dissolved in 250 ml. of xylene was added slowly with vigorous stirring. The mixture started to reflux and a total of 35 ml. of water was collected in the trap. Refluxing was continued for 27.5 hours after which the reaction was terminated. During the course of the reaction, large amounts of yellow, xylene-insoluble materials had precipitated.

The yellow solid was filtered from the cooled mixture and slurried with 200 ml. of warm, 10 percent aqueous potassium hydroxide and then thoroughly washed with water. The trimeric bis(p-nitrophenoxy)phosphonitrile product was dried by removing the water as an azeotrope with xylene. Crude yield: 166.3 g. An additional portion of 17 g. of product was obtained by concentrating the xylene mother liquor.

The trimeric bis(p-nitrophenoxy)phosphonitrile (163.3 g.) product was washed with methanol to remove soluble impurities, and then recrystallized three times from dimethyl formamide and finally from cyclohexanone. The pure product melted at 263–264° C.

The trimeric bis(p-nitrophenoxy)phosphonitrile was analyzed for carbon, hydrogen, nitrogen and phosphorus and the following results were obtained:

*Analysis.*—Calc'd for $C_{36}H_{24}N_9O_{18}P_3$: percent C, 44.95; percent H, 2.49; percent N, 13.10; percent P, 9.66. Found: percent C, 45.06; percent H, 2.61; percent N, 13.21; percent P, 9.45.

The formula of this product is shown below:

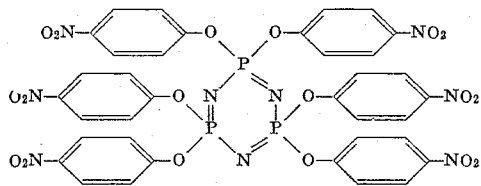

*Example IV.—2,4,6-tris(p-nitrophenoxy)-2,4,6-trichlorophosphonitrile*

A 5 liter three neck flask fitted with stirrer, condenser and dropping funnel was charged with 483.3 g. (3.0 moles) of sodium p-nitrophenoxy and 1500 of xylene. To the heated mixture there was added dropwise, with stirring, a solution of trimeric phosphonitrilic chloride (0.40 mole, 138.9 g.) in 400 ml. of xylene. Refluxing and stirring were continued for 31.5 hours after the addition had completed.

The cooled product was filtered, the filtrate was washed with water, and then concentrated in vacuo up to a flask temperature of 190° C. A total of 183 g. of crude product a dark brown, resinous-like material was collected.

Fractional recrystallization from chloroform and later from toluene afforded 2,4,6-tris(p-nitrophenoxy)-2,4,6-trichlorophosphonitrile, (A) M.P. 225–226° C., in the form of white crystals, and 2,2,4,4,6-pentakis(p-nitrophenoxy)-6-chlorophosphonitrile (B), M.P. 183–184° C., in the form of white crystals.

The two products were analyzed for carbon, hydrogen, nitrogen and phosphorus and the following results were obtained:

(A) *Analysis.*—Calc'd for $C_{18}H_{12}Cl_3N_6O_9P_3$: C, 32.95; H, 1.83; N, 12.80; P, 14.18. Found: C, 32.72; H, 1.88; N, 12.99; P, 14.36.

(B) *Analysis.*—Calc'd for $C_{30}H_{20}ClN_8O_{15}P_3$: C, 41.80; H, 2.35; N, 13.02; P, 10.80. Found: C, 41.97; H, 2.50; N, 13.11; P, 10.90.

The positions of the nitrophenoxy groups and chlorine atoms in product A were established by nuclear magnetic resonance spectroscopy.

The formulae of products A and B are shown below:

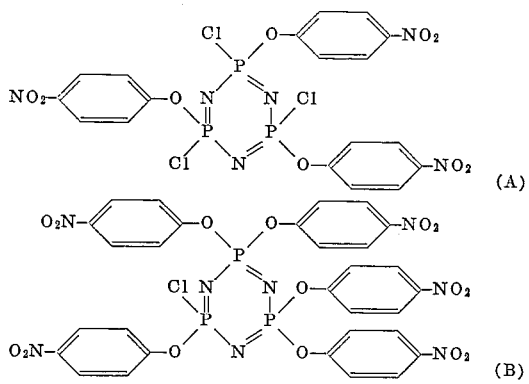

Example V.—Tetrameric bis(p-nitrophenoxy) phosphonitrile

A three liter, three neck flask was charged with 67.5 g. (1.50 moles) of a 53.3 percent suspension of sodium hydride in mineral oil. The hydride was washed with seven 150 ml. portions of ether to remove the mineral oil and then 250 ml. of ether was added.

To this vigorously stirred slurry was added 208.6 g. (1.50 moles) of p-nitrophenol, dissolved in 350 ml. of ether, at such a rate that gentle spontaneous refluxing resulted. The addition required about 15 minutes. Xylene (800 ml.) was added and the ether was stripped to 110° C. bottoms temperature. This produced a pasty, orange colored mass which was difficult to stir.

Tetrameric phosphonitrilic chloride, 69.5 g. (0.15 mole), dissolved in 400 ml. of xylene, was added via a dropping funnel to the warm suspension, causing the pasty mass to break up and turn darker. After refluxing for 26.5 hours. During which time 2.5 ml. of water was collected in the azeotrope trap, the product was permitted to cool.

The precipitated solid was filtered, stirred with 10 percent aqueous potassium hydroxide and washed three times with water. After filtration and azeotroping with xylene, the solid was filtered and dried to give, in quantitative yield, tetrameric bis(p-nitrophenoxy)phosphonitrile having the formula:

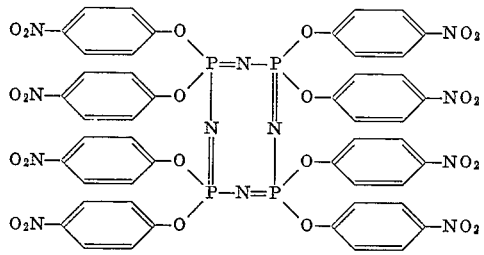

What is claimed is:

1. A cyclic polymeric compound of the formula:

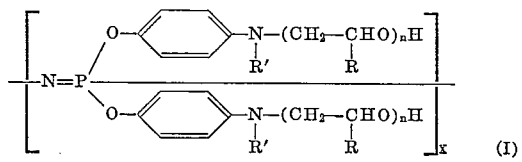

wherein $x$ is an integer of from 3 to 7, $n$ is a number of from about 1 to 20, R is selected from the group consisting of hydrogen, alkyl of from 1 to 4 carbon atoms and hydroxyalkyl of from 1 to 4 carbon atoms, and R' is hydrogen or

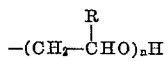

2. The compound of claim 1 wherein $x$ is 3, R is hydrogen, R' is hydrogen and the average value of $n$ is about 5.63.

3. A cyclic polymeric aminophenoxy phosphonitrile compound of the formula:

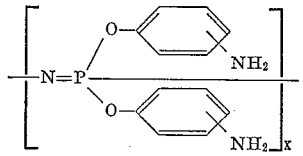

wherein $x$ is an integer of from 3 to 7 inclusive.

4. The compound of the formula:

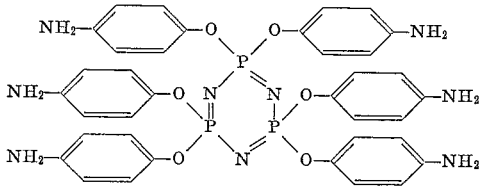

5. A compound of the formula:

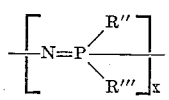

wherein $x$ is an integer of from 3 to 7 inclusive and the R″ and R‴ substituents of each unit of the formula:

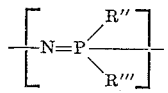

are independently selected from the group consisting of chlorine, bromine, fluorine and the nitrophenoxy group with the proviso that at least one of the R″ and R‴ substituents is a nitrophenoxy group.

6. The compound of the formula:

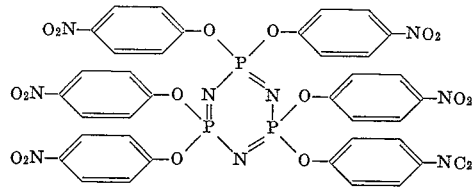

7. The compound of the formula:

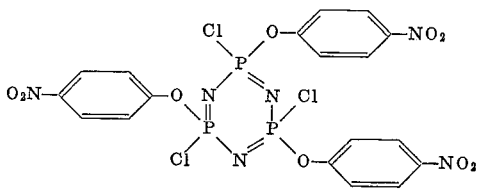

8. The compound of the formula:

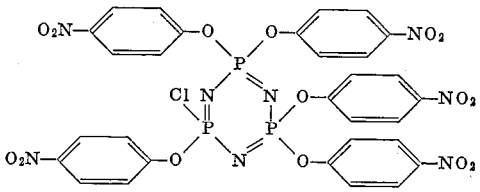

No references cited.

CHARLES B. PARKER, *Primary Examiner*.

FRANK M. SIKORA, *Assistant Examiner*.